United States Patent [19]

Mililo et al.

[11] Patent Number: 5,566,315
[45] Date of Patent: Oct. 15, 1996

[54] PROCESS OF PREDICTING AND CONTROLLING THE USE OF CACHE MEMORY IN A COMPUTER SYSTEM

[75] Inventors: Michael S. Mililo, Louisville; Patrick A. L. De Martine, Littleton, both of Colo.

[73] Assignee: Storage Technology Corporation, Louisville, Colo.

[21] Appl. No.: 368,081

[22] Filed: Dec. 30, 1994

[51] Int. Cl.$^6$ ................................. G06F 13/00
[52] U.S. Cl. .................. 395/440; 395/481; 395/486; 395/876
[58] Field of Search ................ 395/440, 481, 395/486, 875, 876, 877, 879, 880, 445, 250, 463, 600, 700, 446, 497.01

[56] References Cited

U.S. PATENT DOCUMENTS

| | | | |
|---|---|---|---|
| 4,603,382 | 7/1986 | Cole | 395/250 |
| 4,947,319 | 8/1990 | Bozman | 395/700 |
| 5,392,244 | 2/1995 | Jacobson | 395/441 |
| 5,394,531 | 2/1995 | Smith | 395/463 |
| 5,412,780 | 5/1995 | Rushton | 395/250 |
| 5,434,992 | 7/1995 | Mattson | 395/446 |
| 5,457,793 | 10/1995 | Elko | 395/600 |
| 5,463,776 | 10/1995 | Voigt | 395/600 |

*Primary Examiner*—Tod R. Swann
*Assistant Examiner*—Christopher S. Chow
*Attorney, Agent, or Firm*—John R. Ley; John B. Phillips

[57] ABSTRACT

The cache memory space in a computer system is controlled on a dynamic basis by adjusting the low threshold which triggers the release of more cache free space and by adjusting the high threshold which ceases the release of free space. The low and high thresholds are predicted based on the number of allocations which are accomplished in response to I/O requests, and based on the number of blockages which occur when an allocation can not be accomplished. The predictions may be based on weighted values of different historical time periods, and the high and low thresholds may be made equal to one another. In this manner the performance degradation resulting from variations in workload caused by prior art fixed or static high and low thresholds is avoided. Instead only a predicted amount of cache memory space is freed and that amount of free space is more likely to accommodate the predicted output requests without releasing so much cache space that an unacceptable number of blockages occur.

20 Claims, 9 Drawing Sheets

PROCESS OF PREDICTING AND CONTROLLING THE USE OF CACHE MEMORY IN A COMPUTER SYSTEM

The present invention relates to a new and improved process of predicting the use of cache memory in a high performance computer system, and managing the amount of free space available in the cache memory according to the prediction, thereby increasing the amount of cache memory available for access while simultaneously decreasing the number of inhibited or blocked access requests.

BACKGROUND OF THE INVENTION

Most high capacity, high performance computer systems use a variety of different memory or data storage devices arranged in a hierarchy. For example, each processor of the computer system has dedicated registers to hold relatively small amounts of data which is frequently and rapidly accessed during processing. In addition random access memory (RAM) is also provided to hold greater amounts of information which can be accessed on a somewhat slower but nonetheless relatively rapid basis. Cache memory is used to hold even greater amounts of data which is accessed less frequently but which nonetheless must be rapidly accessed to avoid significant restrictions in the performance of the computer system. Main memory is employed to hold massive amounts of data, any particular part of which is typically accessed infrequently.

Access time for a memory refers to the amount of time for the processor to gain access to the memory in response to an input request to receive or read data from the memory, or to gain access to the memory in response to an output request to record or write data into the memory. In general, access time is that time which occurs after an input/output (I/O) request and before a read/write operation is accomplished. The amount of access time of a computer system is dependent upon the inherent speed characteristics of the memory device itself, and the ability of the system as a whole to accommodate the I/O request. To increase the amount of data processing, it is important to minimize the access time. Increased access times result in greater time periods of inactivity from the computer system, thereby decreasing its performance.

The hierarchy of memory devices is intended to reduce access times and improve computer system performance by minimizing the non-productive times when the processor is waiting to read or write data. Because the registers associated with the processors are written to and read from frequently and continually during processing, the registers are typically solid state devices which have very quick access times comparable to the clock or cycle times of the processor. The RAM which is also solid state memory provides greater data holding capacity and still obtains relatively quick access times. Cache memory typically has a much higher capacity than the RAM but has slower access times. The cache memory is typically implemented larger amounts of slower solid state memory. The main memory may be one or more mass storage disk drives, tape reel devices, a library of tape cartridges and other types of extremely high capacity mass storage devices.

In general, as the capacity of the memory increases the access time also increases. It is therefore important to attempt to move the data which is more likely to be needed for a particular processing operation up the hierarchy of memory, to make that data more rapidly available in less access time when it is needed for a processing operation. In general, higher performance computer systems use memory management control processors associated with cache and main memory to process I/O requests and transfer data from the main memory to the cache memory, so that the transferred data will be more quickly available for processing.

Because of the reduced access time of the cache memory, as compared to the main memory, the overall performance of the computer system is greatly enhanced if all I/O requests may be satisfied from cache memory. Each successful satisfaction of an I/O request is sometimes referred to as a "hit". When it is not possible to satisfy an I/O request through the cache memory, further processing by the host computer is stopped or "blocked". A blocked I/O request results in a system "disconnect," during which time the cache memory is disconnected from the processor. A system disconnect is required to read the requested information from the main memory and to write it to the cache memory. A system disconnect also occurs when previously recorded data in the cache memory is eliminated or discarded by freeing space from the cache memory in order to accommodate an output request from the processor. A disconnect can account for hundreds of milliseconds of time delays while the demand for data not presently contained in the cache memory or the demand for free space not presently contained in the cache memory is resolved.

The typical approach employed to attempt to maximize the amount of cache memory space available to accommodate output requests and to minimize the number of blocks or blockages and disconnects in the response to input requests, is to establish fixed low and high thresholds which control the amount of free space available within the cache memory. The free space is that amount of space which is available in the cache memory in which to write data. The fixed low threshold triggers the release of cache memory space, typically on a least recently used basis. A lower threshold of free space means less space is available in the cache memory and higher proportion of the cache memory is used. For example, the low threshold of free space may translate into 98% of the available cache memory space is used, and a high threshold of free space may translate into 90% of the available cache memory space is used. When the amount of free space drops below the low threshold, cache space will be discarded from the cache memory, usually on a least recently used basis. Cache space will be discarded until the high threshold is reached, at which point no further cache space will be released. Releasing cache space means freeing tracks of a rotating disk cache memory to be written to or freeing memory relocations in a solid state cache memory to be written to.

While the use of high and low thresholds to control the release of cache memory space and thereby establish desired amounts of cache free space are effective, the high and low threshold approach is insensitive to workload demands. At best, the high and low thresholds represent a compromise between the size of the working set of data within the cache memory and the frequency of blocks due to an out-of-free space condition.

The out-of-free space condition which results in a blockage occurs when the workload on the cache memory has outpaced the ability of the cache memory controller to increase the amount of free space. The inability to increase the amount of free space may occur because of a relatively large number of I/O requests which must be satisfied on a priority basis compared to free space management processing within the cache memory itself. As a result, free space may not be released sufficiently fast to prevent output requests from totally consuming all of the cache memory space.

In order to anticipate the eventuality that frequent I/O requests will inhibit the release of sufficient cache space to blocks in response to output requests, the low threshold be raised to a smaller percent of the overall cache memory available, for example raised from 98% to 95%. By raising the low threshold, free space will be discarded earlier to reduce the incidence of output request blocks.

Raising the low threshold creates a difficulty when the workload is not as demanding. The larger low threshold will under-utilize the cache memory, since a larger amount of free space in the cache memory is available. Freeing excess cache memory space increases the probability that the data previously available in the free space will be requested by the host processor in an input request, but that data will be unavailable as a result of the free space having been released from the cache memory. The inability of the host processor to access the data which has been unnecessarily freed from the cache memory also results in blockages and the attendant delays from the following system disconnect while the desired data is obtained from the main memory.

It is against this background of information that the improvements in managing the use of cache memory in a computer system according to the present invention have evolved.

SUMMARY OF THE INVENTION

The present invention has resulted from the important recognition that the use of fixed high and low thresholds for managing the release of cache memory free space, represents a tradeoff which can cause performance degradation as the system workload varies. The significant features of the present invention involve predicting the amount of cache memory space which will be required by one or more host computers connected to a cache memory subsystem, and controlling the amount of free space within the cache memory subsystem according to that prediction. By using the prediction rather than fixed high and low thresholds, only a predicted amount of cache memory space is freed and that amount of free space is more likely to accommodate the predicted output requests without releasing so much cache space that blockages in response to input requests occur on a relatively high unacceptable basis. As an end result, the performance of the computer system as a whole in increased, due to increased allocations, reduced blockages and less system disconnects.

Further still, by adjusting the low and high thresholds and controlling the release of free cache memory space on a dynamic basis to reflect the actual operating conditions of the computer system, the enhanced availability of cache memory space is maintained on a basis which more closely tracks the instantaneous workload of the computer system. The degree of adaptability of the dynamic adjustment of the present invention is adjustable, and accommodates the possibilities that the computer system will experience a high load of I/O requests which would otherwise prevent the effective release of cache memory space because of the priority given to the I/O requests.

In accordance with these and other features, the process of the present invention involves the steps of determining a rate of allocations to a cache memory in a computer system having a host computer and a main memory, in response to I/O requests from the host computer. An allocation results from the performance of a read or write event in the cache memory in response to an I/O request from the host computer. The invention also involves calculating an allocation predictor related to the rate of allocations determined, setting a threshold of free space in the cache memory having a predetermined direct relationship to the allocation predictor, releasing cache space in the cache memory to change the amount of free space in the cache memory based on the threshold established, and performing these steps at each of a predetermined number of repetitive control intervals during continuous operation of the computer system.

In accordance with other embodiments of the present invention, the process further involves setting low and high thresholds of free space in the cache memory which respectively trigger and terminate the release of cache space in a direct relationship to the allocation predictor. A rate of blockages to the cache memory in response to I/O requests from the host computer is determined. A blockage results from an inability to perform a read or write event in the cache memory in response to the I/O request from the host computer. Other steps include calculating a blockage predictor related to the rate of blockages determined, setting the low threshold in a predetermined direct relationship to the allocation predictor, setting the high threshold in a predetermined direct relationship to the blockage predictor, releasing cache space to increase the amount of free space in the cache memory when the amount of free space decreases to the low threshold, and ceasing the release of cache space when the amount of free space reaches the high threshold. Further still the allocation and blockage predictors may be set based on a plurality of different rates determined over different time periods and by weighting each of the different rates differently in the calculation of the predictors.

A more complete appreciation of the present invention and its scope can be obtained from the accompanying drawings which are briefly described below, from the following detailed description of presently preferred embodiments of the invention, and from the appended claims.

DETAILED DESCRIPTION

The process of the present invention is preferably implemented by a computer executing instructions contained in software. The software is represented in essential part by flow charts shown in the accompanying Figure drawings. The computer which executes the instructions defining the process of the present invention is included in a computer system such as that shown at 20 in FIG. 1.

Figure 1:
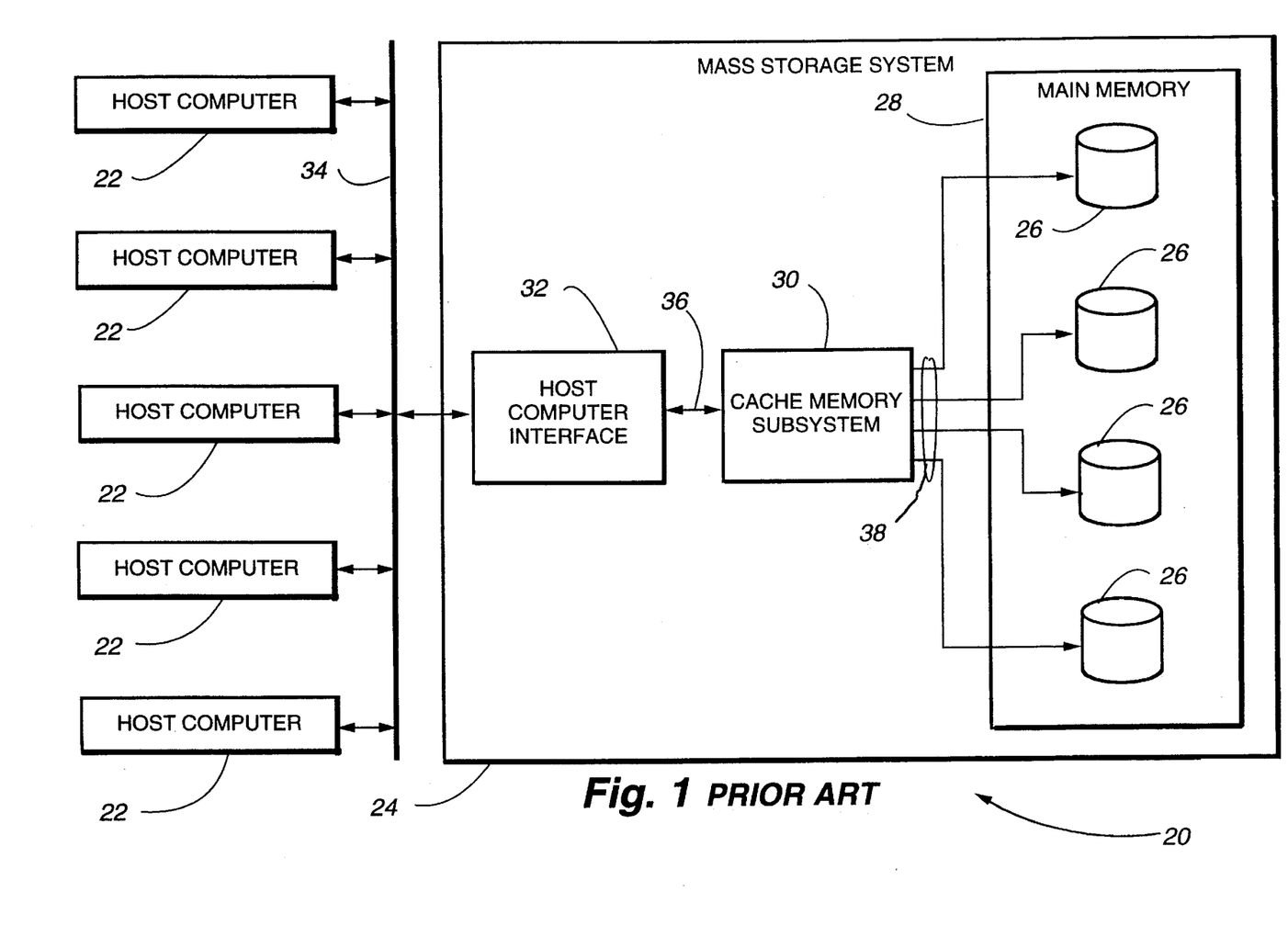
FIG. 1 is a block diagram of a prior art computer system which includes a plurality of host computers and a mass data storage system, with which the present invention may be employed.

The computer system 20 includes at least one and typically a plurality of host computers 22. Each host computer 22 is connected to a mass storage system 24. The mass storage system 24 includes data storage devices such as disk drives 26 which constitute a main memory 28 of the system 20. The main memory 28 provides a very high capacity for storing data, and the access time to obtain or read data from the main memory or to write or record data in the main memory 28 is relatively long.

To decrease the time of inactivity associated with reading and writing data to and from the main memory 30, the computer system 20 also includes a cache memory subsystem 30. The cache memory subsystem 30 connects to the disk drives 26 or other elements of the main memory 28. A plurality of disk drives 26 are typically connected in parallel with one another in an array to create the main memory 28. Data is read from the disk drives 26 of the main memory 28 and stored in the cache memory subsystem 30 for quicker access by the host computers 22. The functional ideal of the cache memory subsystem 30 is to obtain the data from the main memory 28 in a less time critical manner and have it available for the host computers to use with little or no delay.

Figure 2:
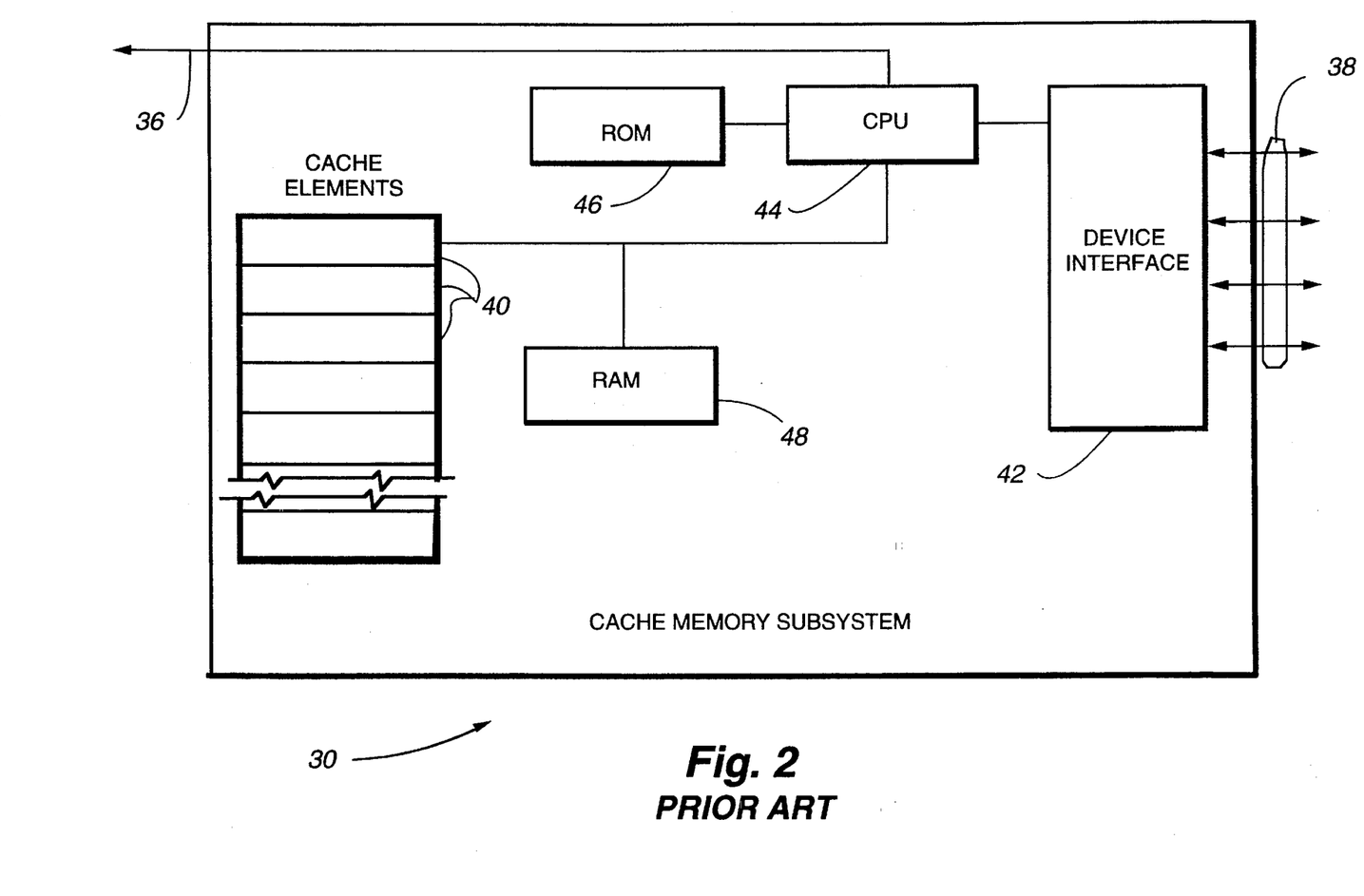
FIG. 2 is a block diagram of a cache memory subsystem contained within the mass storage system shown in FIG. 1.

The cache memory subsystem 30 is connected to a host computer interface 32, as is shown in FIG. 2. The host computer interface 32 receives the I/O requests from the host computers 22 which are applied over a bus 34. The I/O requests on the bus 34 are processed by the host computer interface 32 and the related I/O request signals are supplied over an internal bus 36 to the cache memory subsystem 30. The cache memory subsystem 30 responds to the I/O request signals on the bus 36 and delivers related signals over a main memory bus 38 to the disk drives 26 or other memory elements of the main memory 28. In response to the signals on the main memory bus 38, the disk drives 26 or other memory elements obtain the requested data and the cache memory subsystem reads and records it, or the cache memory subsystem writes data to the memory elements of the main memory 28.

The cache memory subsystem 30 stores the data in a plurality of internal cache memory elements 40. The internal cache memory elements 40 typically take the form of conventional solid state buffers or registers.

Signals from the main memory bus 38 pass through a cache memory device interface 42 and are applied to a central processing unit (CPU) 44. The CPU 44 records the signals representing the data from the main memory 28 into the cache memory elements 40. I/O requests originating from the host computers 22 (FIG. 1) are supplied by the host computer interface 32 over the internal bus 36 and are received by the CPU 44. In response to the input requests, the CPU 44 accesses the cache memory elements 40 and delivers the requested information over the internal bus 36 to the host computers. In response to output requests on the internal bus 36, the CPU 44 writes to the cache memory elements 40, that data supplied over the internal bus 36 from the host computers. If the data requested in not available in the cache memory, or if the cache memory contains insufficient space to write the data, the CPU blocks further cache memory operations until the requested data is obtained from the main memory 28 (FIG. 1) or free space is made available in the cache memory by the release of cache space.

Operation of the cache memory subsystem 30 is controlled programmed instructions which may be contained in a read only memory (ROM) 46 or a random access memory (RAM) 48 connected to the CPU 44. In general the substantial part of the program for achieving the present invention will be contained in the RAM 48, as a result of instructions executed by the CPU 44 causing the program to be obtained from one of the disk drives 26 of the main memory 28 (FIG. 1). These instructions recorded control the CPU 44 in accordance with the present invention as well as in accordance with the other typical cache memory management control functions not forming a part of the present invention. In addition to containing the program for the present invention, the RAM 48 is also used by the CPU 44 when accomplishing the various processing functions associated with execution of the program of the present invention.

The software program instructions involve the determination of "allocations" and "blocks" or "blockages" during performance of the process of the present invention.

An "allocation" describes the satisfactory performance of a read or write event in cache memory which occurs in response to an I/O request from a host computer 22. The I/O request is applied by a host computer 22 to the host computer interface 32 (FIG. 1), and from the interface 32 over the internal bus 36 to the CPU 44. If the I/O request is an input request, an allocation is satisfied when the information requested by the host computer has been previously recorded in the cache memory elements 40 and is read from the cache memory by the host computer. This type of allocation is commonly referred to as a "read hit." If the I/O request is an output request, an allocation will occur if enough free space exists in the cache memory to record the data which the host computer desires to record. In this case, the allocation is commonly referred to as a "write hit."

When an allocation cannot be satisfied by a read hit or a write hit, a "block" or "blockage" occurs. A blockage therefore refers to the inability of the cache memory subsystem 30 to perform the I/O operation requested, without first performing a "disconnect." If the I/O request is an input request, a blockage occurs when the information requested by the host computer is not recorded in the cache memory elements 40. In this case, the host computer is disconnected from the cache memory subsystem 30 while the requested data is obtained from main memory 28 (FIG. 1) and recorded in the cache memory elements 40. If the I/O request is an output request, a blockage occurs if not enough free space exists in the cache memory to record the data which the host computer desires to record. In both cases, a "disconnect" occurs while the desired data is obtained from the main memory and recorded in the cache memory or while cache space is discarded, thereby increasing the cache free space to make room to record the data.

The present invention monitors the number of allocations and determines one or more allocation rates, monitors the number of blockages and determines one or more blockage rates, calculates an allocation predictor from the allocation rates and a blockage predictor from the blockage rates and adjusts the amount of cache free space available under conditions determined in accordance with algorithms involving the allocation and blockage predictors.

Figure 3:
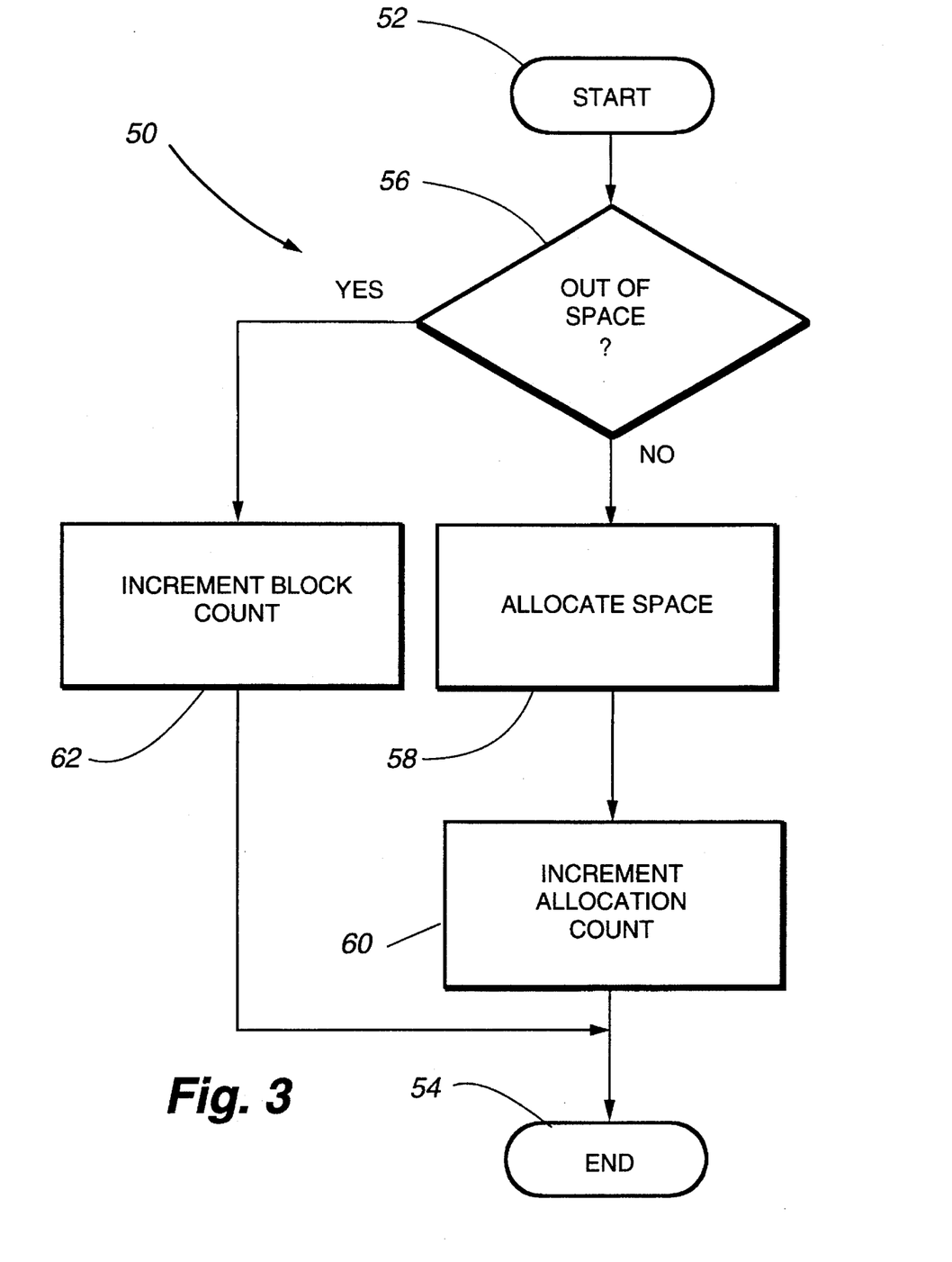
FIG. 3 is a flow chart illustrating a portion of the process of the present invention involving counting of allocations to and blockages from cache memory space.

The portion of the process flow of the present invention which determines the number of allocations and the number of blockages is shown at 50 in FIG. 3. The steps in the portion 50 of the process begin at 52 and end at 54. The process portion 50 is driven by host computer I/O requests for cache space in the cache memory subsystem 30 (FIG. 2) and results in either an allocation or a blockage. A determination is made at 56 whether the cache memory subsystem can satisfy the I/O request or not. If the cache memory is not out of space, because sufficient free space exists in the cache memory to satisfy an output request or because an input request requests data which is recorded within the cache memory space, an allocation of space occurs at 58. A running count of the number of allocations is increased by one at 60. On the other hand, if the cache memory is out of space, because insufficient free space exists in the cache memory to accommodate an output request, or because the data requested in an input request is not recorded within the cache memory space, the I/O request is blocked. The blocked I/O request increments a block count at 62. After incrementing the counts at 60 or 62, the program portion 50 ends at 54.

The allocation count at 60 and the blockage count at 62 are maintained in separate count registers. Each allocation or each blockage results in incrementing the count contained within the count register by one. The count registers are contained within the RAM 48 of the cache memory subsystem 30 FIG. 2.

Figure 4:
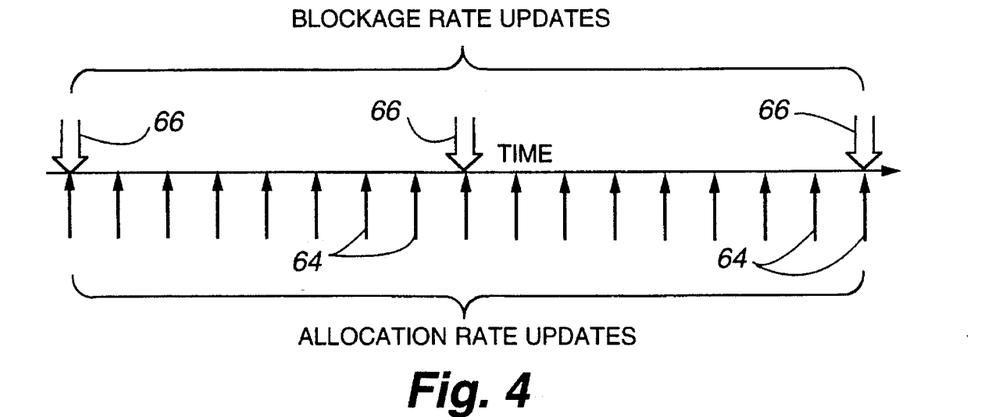
FIG. 4 is an illustration of events occurring over time from which an allocation rate and a blockage rate is calculated according to the process of the present invention, based on I/O requests made by the host computer to the cache memory subsystem shown in FIGS. 1 and 2.

The number of allocations and the number of blocks are read at predetermined regular time intervals to establish an allocation rate and to establish a blockage rate. Preferably, the frequency at which the allocation rate is determined is greater than the frequency at which the blockage count is determined, as is shown in FIG. 4. Narrow arrows 64 indicate the time intervals and the frequency at which the allocation rate is determined over an arbitrary time period. Over the similar time period, broad arrows 66 indicate the time intervals and the frequency at which the blockage rate is determined. In the preferred embodiment, the allocation rate represented by each single arrow 64 is determined at an allocation interval every 128 milliseconds, while the blockage rate represented by each double arrow 66 is determined at a blockage interval every 1024 milliseconds. After determining each allocation rate and each blockage rate, a weighted allocation and a weighted blockage rate is also determined by use of the new values determined at each of the intervals represented by the arrows 64 and 66.

Figure 5:
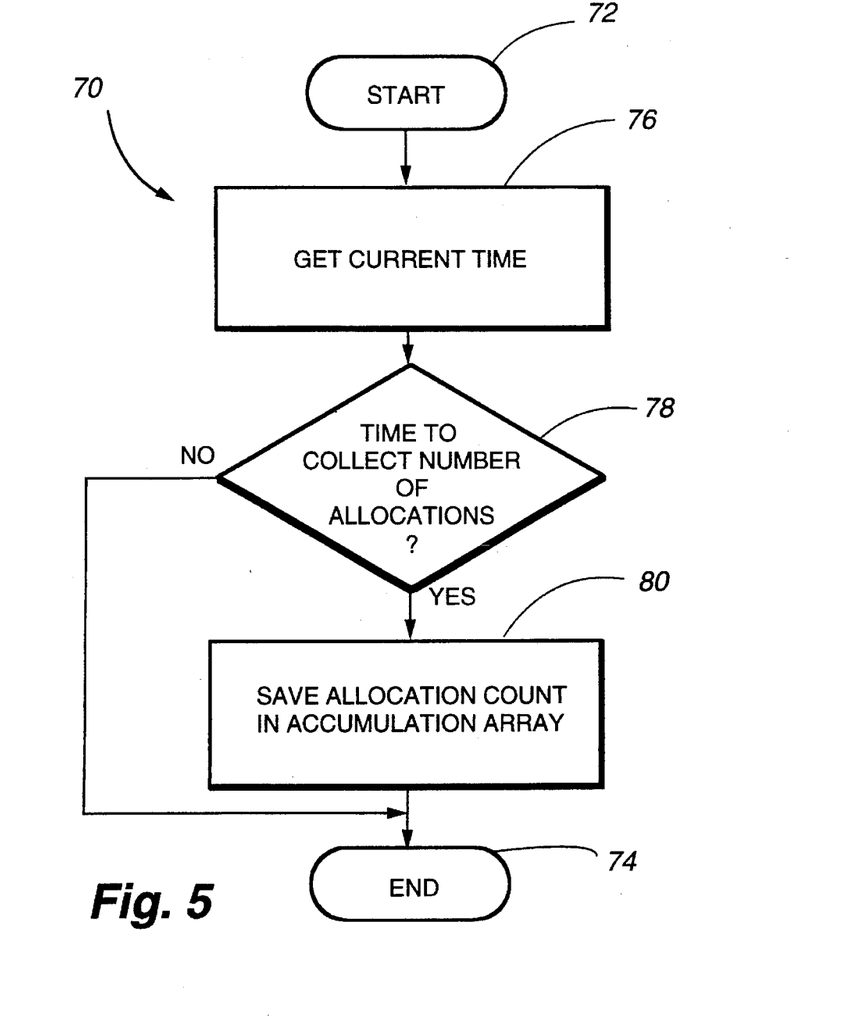
FIG. 5 is a flow chart illustrating a portion of the process of the present invention which involves determining an allocation rate.

The determination of the allocation rate is illustrated by the portion 70 of the program process flow as shown in FIG. 5. The steps of the allocation rate determination portion 70 of the process flow begin at 72 and end at 74. The present time is first obtained at 76. After obtaining the present time at 76, a determination is made at 78 whether sufficient time has elapsed to collect or count the number of allocations which have occurred during the interval (as measured at 60 in FIG. 3). If an insufficient amount of time has elapsed, the process flow portion 70 ends at 74. However, if the time has arrived to collect the number of allocations, as would be indicated by the occurrence of an allocation interval shown by a narrow arrow 64 in FIG. 4, the allocation count is read and is saved in an accumulation array as shown at 80, before the program flow portion 70 ends at 74.

An example of an allocation accumulation array 82 is shown in FIGS. 6A, 6B, 6C and 6D. The accumulation array 82 is memory space within the RAM 48 (FIG. 2). The accumulation array 82 contains a sufficient number of locations in which to record the allocation count at 80 (FIG. 5) at the allocation intervals determined at 78 (FIG. 5). At each allocation interval, the number of allocation counts is recorded in a different cell or portion of the accumulation array 82.

Figure 6A:
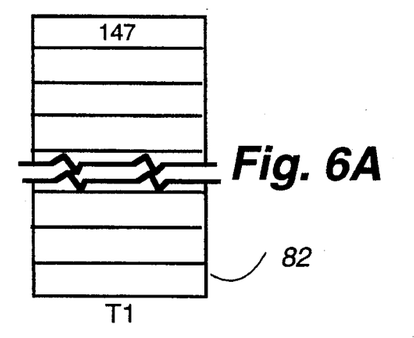
FIGS. 6A, 6B, 6C and 6D are illustrations of an allocation array in which allocation count numbers are recorded in the array at times $T_1, T_2, T_3$ and $T_n$ according to the process flow shown in FIG. 5.
Figure 6B:
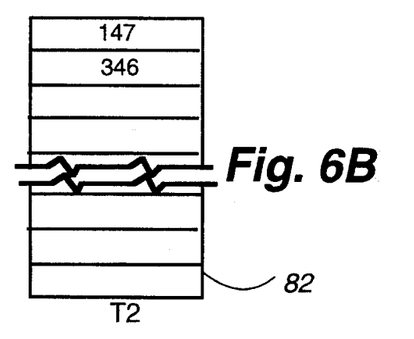
Figure 6C:
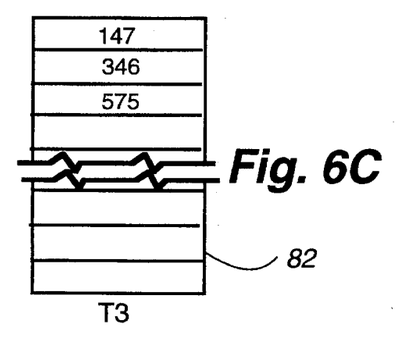
Figure 6D:
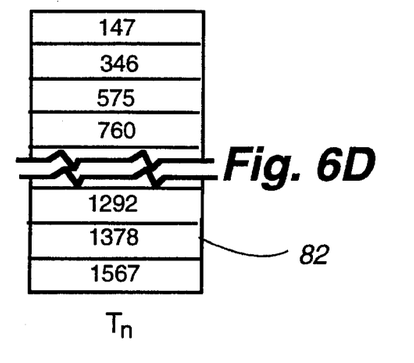

For example, at the first allocation interval occurring at time $T_1$, 147 allocations had occurred and that value is recorded in the first cell of the array 82, as shown in FIG. 6A. At the next allocation interval occurring at time $T_2$, an exemplary 346 allocations had occurred and that value is recorded in the second cell of the array 82, as shown in FIG. 6B. In the third allocation interval occurring at time $T_3$, 575 allocations had occurred and that value is recorded in the third cell of the array 82, as shown in FIG. 6C. By a last allocation interval occurring at time $T_n$, all of the allocations count values have been recorded in the array 82, as shown in FIG. 6D. The number of intervals n and the number of cells of the array 82 are equal and that number n is one which will allow the accumulation of sufficient number of accumulation count values required to satisfy the equations defining the allocation predictor described below.

Figure 7:
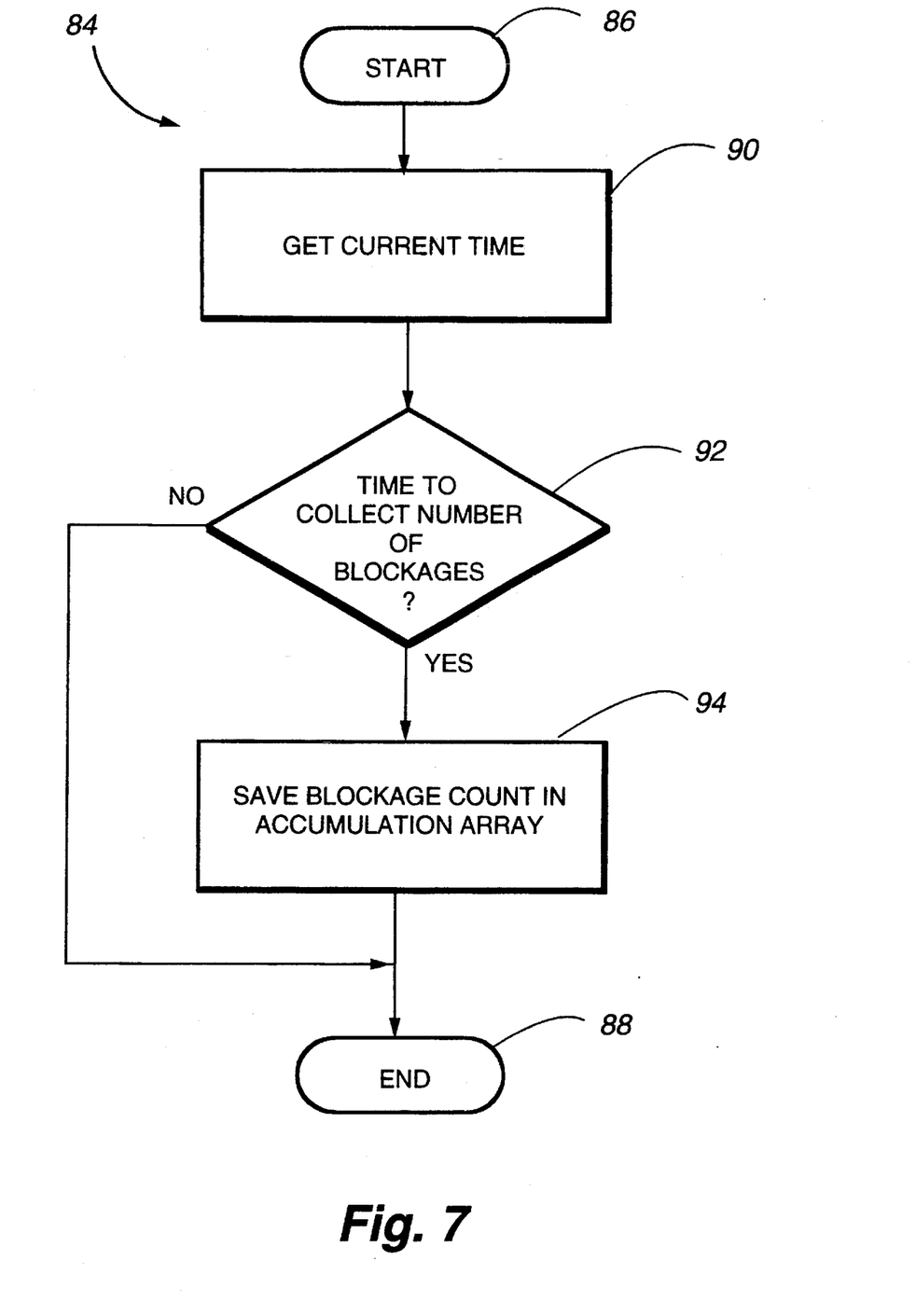
FIG. 7 is a flow chart illustrating a portion of the process of the present invention which involves determining the blockage rate.
Figure 8A:
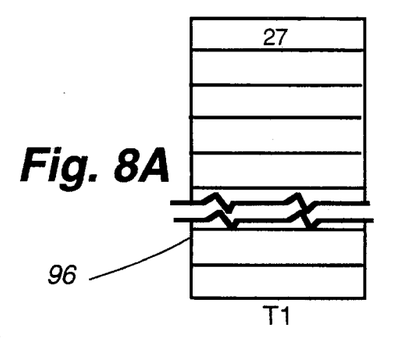
FIGS. 8A, 8B, 8C and 8D are illustrations of a blockage array in which blockage count numbers are recorded in the array at times $T_1$, $T_2$, $T_3$ and $T_n$ according to the process flow shown in FIG. 7.
Figure 8B:
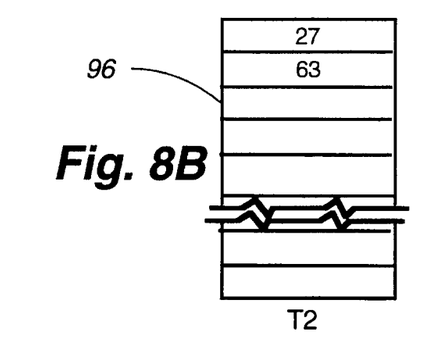
Figure 8C:
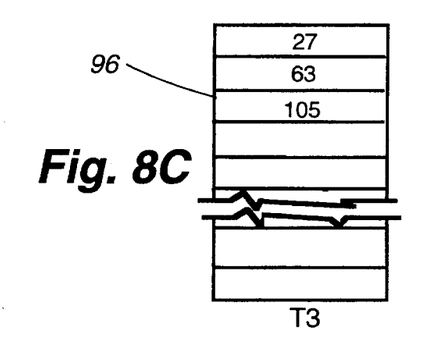
Figure 8D:
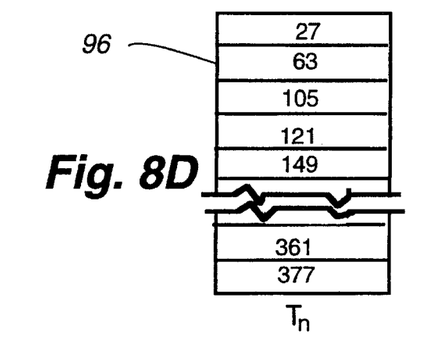

The blockage rate is determined as shown in FIG. 7. The blockage rate determination occurs in a manner similar to the determination of the allocation rate as shown in FIG. 5. The steps shown at 86, 88, 90, 92, and 94 are entirely similar to those described at 72, 74, 76, 78 and 80 in FIG. 5, respectively, with the exception that the time between blockage intervals determined at 92 is different from and independent of the time between allocation intervals determined at 78 in FIG. 5. As shown in FIG. 4, the time of each blockage interval, represented by the broad arrows 66, is considerably longer than the time of each allocation interval, represented by the narrow arrows 64.

Similarly, FIGS. 8A, 8B, 8C and 8D illustrate an accumulation array 96 in which the blockage count is recorded as shown at 94 in FIG. 7. The accumulation array 96 is also a part of the RAM 48 (FIG. 2). The number of intervals n and the number of cells of the array 96 are equal and that number n is one which will allow the accumulation of sufficient number of blockage count values required to satisfy the equations defining the blockage predictor described below.

Figure 9:
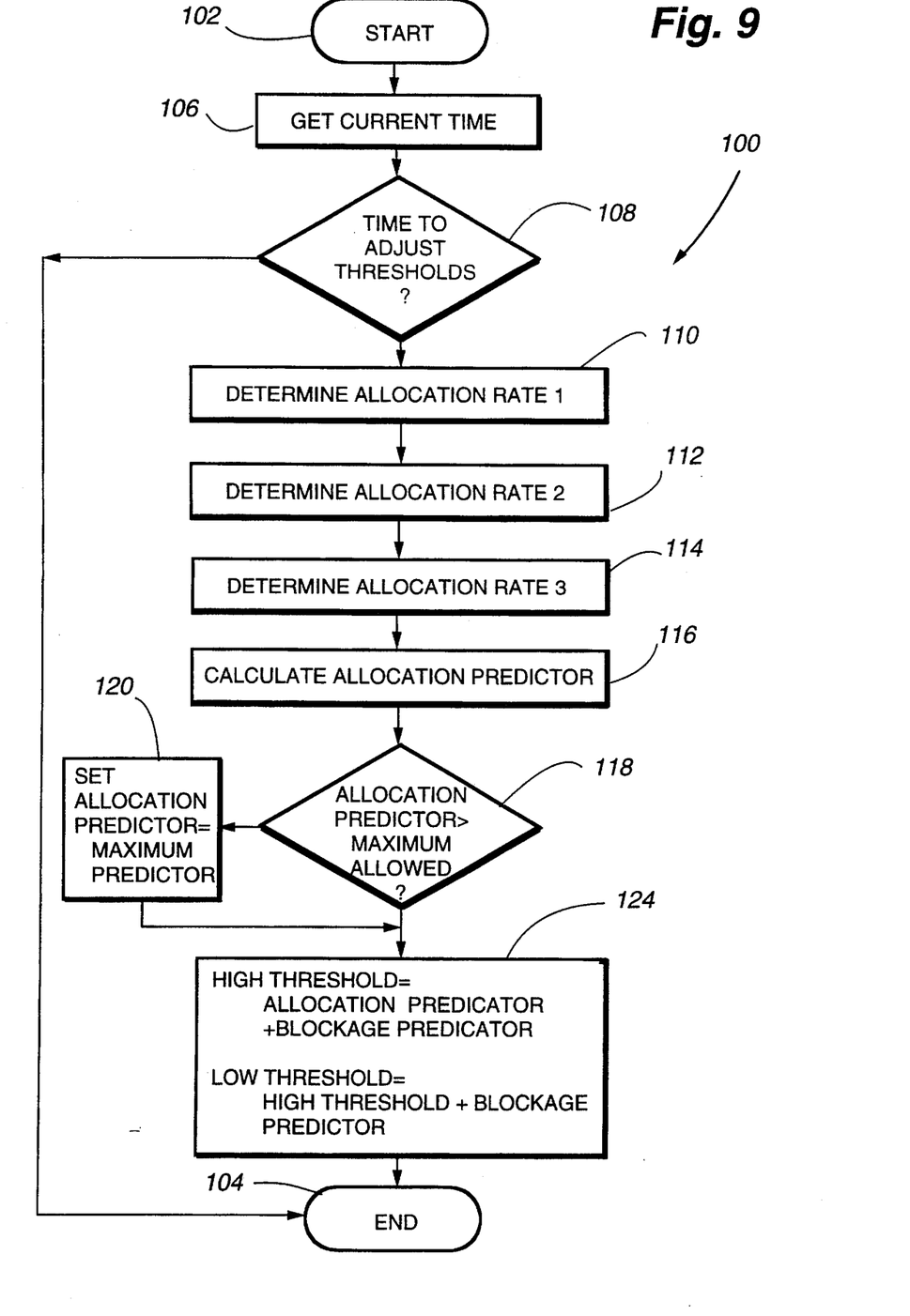
FIG. 9 is a flow chart illustrating a portion of the process of the present invention which involves calculating an allocation predictor and setting a high threshold of cache memory free space and a low threshold of cache memory free space based on the calculated allocation and blockage predictors.

A portion of the process flow of the present invention in which different allocation rates are determined and thresholds for controlling free space in the cache memory are established are shown at 100 in FIG. 9. The process flow starts at 102 and ends at 104. The current time is first obtained as shown at 106. If less than a predetermined amount of time has elapsed since the last time the thresholds have been adjusted, as determined at 108, the process flow portion 100 ends at 104. When the predetermined amount of time has elapsed for adjusting the thresholds, as determined at 108, a first allocation rate will be determined at 110, a second allocation rate will be determined at 112 and a third allocation rate will be determined at 114. Using the three allocation rates, an allocation predictor will be calculated at 116.

The first allocation rate is determined at 110 and is determined over a first predetermined period of time or number of allocation intervals, which in the preferred embodiment is 128 milliseconds or once every allocation interval shown by a narrow arrow 64 in FIG. 4. The first rate is determined by subtracting the allocation count value determined on the occurrence of each interval from the previous allocation count value contained in the accumulation array 82 (FIGS. 6A, 6B, 6C and 6D), in the preferred embodiment. Thus, for example, the first allocation rate is determined from the allocation count values in the first two cells of the array 82 shown in FIG. 6B by subtracting 147 from 346, giving a first allocation rate of 199. In other embodiments of the invention, the first allocation rate could be determined over a time greater than a single allocation interval or over more than one allocation interval.

The second allocation rate is determined at 112. The second allocation rate is an average allocation rate over a second predetermined time or number of allocation intervals which is greater than the first predetermined time period or the first number of allocation intervals. The second predetermined time period is represented by a plurality of allocation intervals. In the preferred embodiment the number of allocation intervals of the second predetermined time period is 8. To determine the second allocation rate in the preferred embodiment, the current allocation count is subtracted from the allocation count which occurred eight intervals before the current allocation count was determined, and the result is divided by 8. The second rate is the difference in allocation count values which occurred over the number of intervals during which the second predetermined time elapsed, divided by that number of allocation intervals. The allocation count value eight intervals previous to the present allocation count value is recorded in the eighth preceding cell of the accumulation array 82.

The third allocation rate is also an average allocation rate over a third predetermined time interval which is even longer than the second predetermined time interval. In the preferred embodiment the third predetermined interval of time over is about 8 seconds (8,192 milliseconds) or 64 allocation intervals of 128 milliseconds each. The third allocation rate is therefore determined in the preferred embodiment by subtracting from the current allocation count value, the allocation count value which existed 64 intervals previous to it, and dividing the result by 64. Of course, the allocation count value which existed 64 intervals previously is recorded in the accumulation array 82 at a cell which is 64 locations previous to the cell location where the current rate is recorded.

The amount of memory space which is therefore required in the accumulation array 82 for recording the allocation count values must accommodate calculation of the third average rate. In the preferred embodiment this will require 65 separate locations in the accumulation array 82. After accommodating the maximum number of allocation count values, the most recent allocation count values may be read into the array 82 to replace the oldest allocation count values on a recirculating basis.

The allocation predictor is calculated at 116, as shown in FIG. 9, by an equation which utilizes the first, second and third allocation rates calculated at 110, 112 and 114, respectively. The allocation rate predictor preferably weights the effect of all three rates as to attempt to maximize the responsiveness of the cache memory allocations without creating an oscillatory or hunting condition in which overadjustments are constantly occurring. By using the three rates, and weighting each of them with decreasing importance, good responsiveness is obtained without overcorrection.

An allocation predictor which has achieved good responsiveness without excessive overcorrection is given by the following Equation 1:

$$\text{allocation predictor} = \text{allocation rate 1} + \frac{\text{allocation rate 2}}{8} + \frac{\text{allocation rate 3}}{64}$$

Equation 1 weights the first allocation rate to the maximum amount, giving it the greatest overall effect in determining the allocation predictor. In the preferred embodiment, the weighting value of the first rate is one. The second rate also is weighted by a constant value, which in the preferred embodiment is ⅛ of the weighting value of the first rate. The third rate is weighted even less, which is the preferred embodiment is 1/64 of the weighting value of the first rate and ⅛ of the weighting value of the second rate. Other values could be employed for the weighting constants, depending upon the particular application and the information derived concerning the workload of the computer system with which the present invention is employed.

The full or unitary weighting value of the first rate gives it the predominant importance and value in determining the allocation predictor, thereby causing the allocation predictor to have a high level of instantaneous responsiveness to the most immediate allocation rate (the first rate). However, the diminishing importance of weighting values of the second and third rates in the allocation predictor achieve other benefits. By including the effects of the second and third rates, the allocation predictor will always be slightly more than the most immediate allocation rate, meaning that a margin for some excess above the current demand will always be available without incurring blockages. The effects of the second and third rates also provide some margin of historical stability in the allocation predictor to avoid overcorrection and its attendant oscillatory, hunting and overshoot effects. In addition, the effects of the second and third rates also provide some margin of anticipation for the circumstance of a high workloads of I/O requests, which because of their priority, might otherwise prevent the necessary amount of free cache memory space from being discarded rapidly enough.

Once the allocation predictor has been calculated at 116, a determination is made at 118 as to whether the calculated allocation predictor is greater than a predetermined maximum allowed allocation predictor value. The predetermined maximum allocation predictor value is one which has been established as being an upper limit for the maximum amount of cache memory space which may be discarded. Thus, if the allocation predictor calculated at 116 is greater than the maximum established for comparison at 118, the allocation predictor is set to the value of the maximum predictor at 120. If the calculated allocation predictor is less than the maximum allowed value, no adjustment is made. In the preferred embodiment, the maximum allowed allocation for which the comparison is established at 118 is ½ of the cache memory space.

Next, as shown at 124, the high and low thresholds are adjusted at the end of the control interval established at 108. The high threshold is set equal to the allocation predictor calculated at 116 plus the blockage predictor which is next described in conjunction with FIG. 10. The low threshold is set equal to the high threshold as just established plus the blockage predictor.

Figure 10:
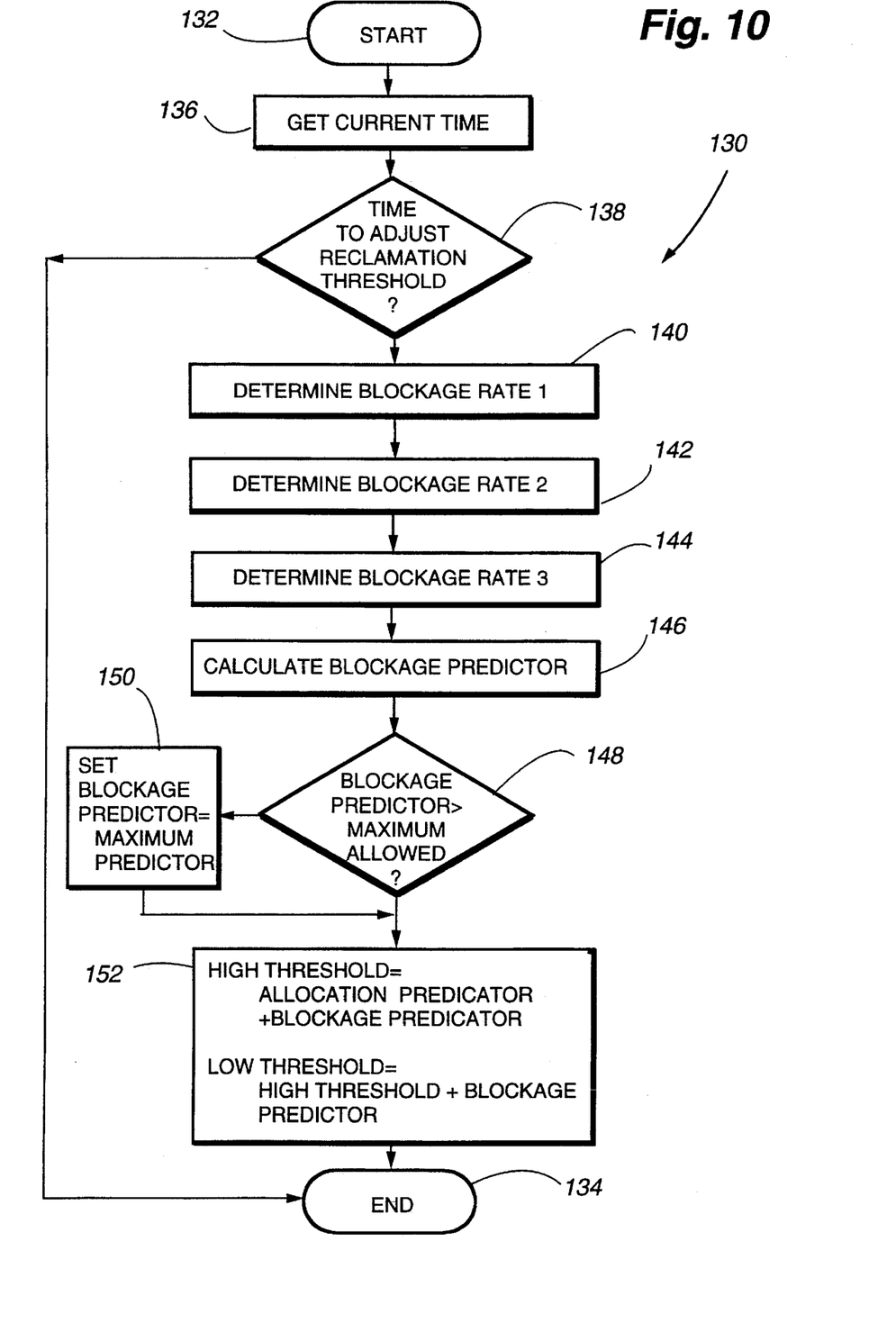
FIG. 10 is a flow chart illustrating a portion of the process of the present invention which involves calculating a blockage predictor and setting high and low thresholds of cache memory free space based on the calculated allocation and blockage predictors.

The portion of the process flow of the present invention in which different blockage rates are determined and the blockage predictor is calculated is shown at 130 in FIG. 10. The occurrence of blockages indicates that adequate free cache memory space has not been anticipated early enough. In order to anticipate sufficient free cache memory space early enough to avoid blockages, the low threshold must be increased (set to a lower percentage of overall cache memory) to anticipate the higher demand more quickly.

The portion 130 of the process flow starts at 132 and ends at 134. The current time is first obtained as shown at 136. If less than a predetermined amount of time has elapsed since the last time the low or free space reclamation threshold has been adjusted, as determined at 138, the process flow portion 130 ends at 134. When the predetermined amount of time of a control interval has elapsed for adjusting the low reclamation threshold, as determined at 138 and as shown by the broad arrows 66 in FIG. 4, a first blockage rate will be determined at 140, a second blockage rate will be determined at 142 and a third blockage rate will be determined at 144. Using the three blockage rates an blockage predictor will be calculated at 146.

The first blockage rate is determined at 140 and is determined over a first predetermined blockage interval or period of time, which in the preferred embodiment is 1024 milliseconds or every interval shown by a broad arrow 66 in FIG. 4. The first rate is determined by subtracting the blockage count determined on the occurrence of each blockage interval from the previous blockage count contained in the accumulation array 96 (FIGS. 8A, 8B, 8C and 8D), in the preferred embodiment. Thus, for example, the first blockage rate is determined from the blockage count values in the first two cells of the array 82 shown in FIG. 8B by subtracting 27 from 63, giving a first blockage rate of 36. In other embodiments of the invention, the first blockage rate could be determined over a time period greater than a single blockage interval.

The second blockage rate is determined at 142. The second blockage rate is an average blockage rate over a second predetermined time or number of blockage intervals which is greater than the first predetermined time period and blockage interval. The second predetermined time period is represented by a plurality of blockage intervals. In the preferred embodiment the number of blockage intervals of the second predetermined time period is about 8 seconds or 8 blockage intervals of 1024 milliseconds each (8,192 milliseconds). To determine the second blockage rate in the preferred embodiment, the current blockage count value is subtracted from the blockage count value which occurred eight blockage intervals before the current blockage count value was determined, and the result is divided by 8. The second blockage rate is the difference in blockage count values which occurred over the number of blockage intervals occurring during the second predetermined time period, divided by that number of blockage intervals. The blockage count value eight blockage intervals previous to the present blockage count is recorded in the eighth preceding cell of the accumulation array 96.

The third blockage rate is also an average blockage rate over a third predetermined time period or number of blockage intervals which is even greater than the second predetermined time period or number of blockage intervals. In the preferred embodiment the third predetermined interval of time extends over about 64 seconds or 64 blockage intervals of 1024 milliseconds each (65,536 milliseconds). The third blockage rate is therefore determined in the preferred embodiment by subtracting from the current blockage count value, the blockage count value which existed 64 blockage intervals previous to it, and dividing the result by 64. Of course, the blockage count value which existed 64 intervals previously is recorded in the accumulation array 96 at a cell which is 64 locations previous to the cell location where the current blockage count value is recorded.

The amount of memory space which is required in the accumulation array 96 for recording the blockage count values must accommodate the calculation of the third average rate. In the preferred embodiment this will require 65 separate locations in the accumulation array 96. After accommodating the maximum number of blockage count values, the most recent blockage count values may be read into the array 96 to replace the oldest blockage count values on a recirculating basis.

The blockage predictor is calculated at 146, as shown in FIG. 10, by an equation which utilizes the first, second and third blockage rates calculated at 140, 142 and 144, respectively. The blockage rate predictor preferably weights the effect of all three rates as to maximize the responsiveness of the cache memory blockages without creating an oscillatory or hunting condition in which over-adjustments are constantly occurring. By using the three rates, and weighting each of them with decreasing importance, good responsiveness is obtained without overcorrection.

An blockage predictor which has achieved good responsiveness without excessive overcorrection is given by the following Equation 2:

$$\text{blockage predictor} = \text{current blockage predictor} + \text{blockage rate 1} + \frac{\text{blockage rate 2}}{8} + \frac{\text{blockage rate 3}}{64}$$

Equation 2 weights the first blockage rate to the maximum amount, giving it the greatest overall effect in determining the blockage predictor. In the preferred embodiment, the weighting value of the first rate is one. The second rate also is weighted by a constant value, which in the preferred embodiment is ⅛ of the weighting value of the first rate. The third rate is weighted even less, which is the preferred embodiment is 1/64 of the weighting value of the first rate and ⅛ of the weighting value of the second rate. Other values could be employed for the weighting constants, depending upon the particular application and the information derived concerning the workload of the computer system with which the present invention is employed.

The full weighting value of the first blockage rate gives it the predominant importance and value in determining the blockage predictor, thereby causing the blockage predictor to have a high level of instantaneous responsiveness to the most immediate blockage rate (the first rate). However, the diminishing importance of weighting values of the second and third rates in the blockage predictor achieve other benefits. By including the effects of the second and third rates, the blockage predictor will always be slightly more than the most immediate blockage rate, meaning that a margin for some excess above the current blockage rate will always be available to trigger the release of free cache memory space. The effects of the second and third rates also provide some margin of historical stability in the blockage predictor to avoid over-correction and its attendant oscillatory, hunting and over-shoot effects. In addition, the effects of the second and third rates also provide some margin of anticipation for the circumstance of a high workloads of I/O requests, which because of their higher priority, might otherwise prevent the necessary amount of free cache memory space from being discarded rapidly enough.

Once the blockage predictor has been calculated at 146, a determination is made at 148 as to whether the calculated blockage predictor is greater than a predetermined maximum allowed blockage predictor value. The predetermined maximum serves as a limiting factor to prevent a rapid change in demand as would result if a very high number of blockages occurred in a short period of time. The maximum predictor used in the determination at 148 helps to prevent overshoots in system response.

If the blockage predictor calculated at 146 is greater than the maximum established for comparison at 148, the blockage predictor is set to the value of the maximum predictor at 150. If the calculated blockage predictor is less than the maximum allowed value, no adjustment is made. In the preferred embodiment, the maximum allowed blockage for which the comparison is established at 118 is ½ of the cache memory space.

Next, as shown at 152, the low thresholds for triggering or instituting the release of cache memory space and the high threshold for ceasing the release of cache memory space are set, in the same manner as have been described at 124 in FIG. 9. Thereafter the process flow portion 130 ends at 134.

Figure 11:
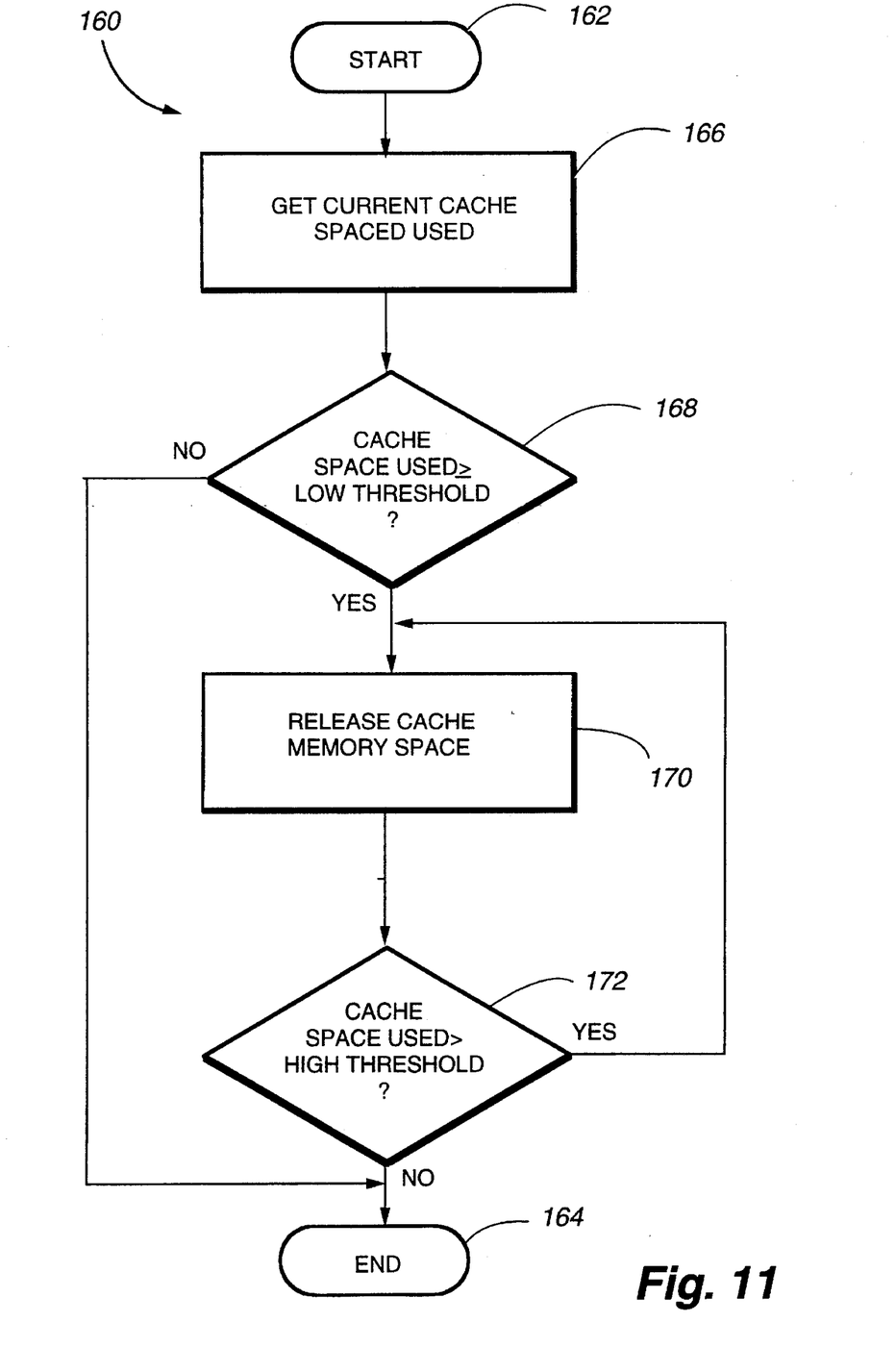
FIG. 11 is a flow chart illustrating a portion of the process of the present invention which involves releasing cache memory space based on the high and low thresholds set as shown in FIGS. 9 and 10.

The CPU 44 of the cache memory subsystem 30 (FIG. 2) uses the high threshold and the low threshold established at 124 (FIG. 9) and at 152 (FIG. 10) to manage the cache memory space in a portion of the process flow of the present invention shown at 160 in FIG. 11. The process flow portion 160 starts at 162 and ends at 164. The first step 166 in the in the process flow portion 160 is to determine the amount of the current cache memory space which is in use. Next, a determination is made at 168 whether the cache memory space used is greater than or equal to the low threshold. If so, cache memory space is released at 170. If not, the process flow ends at 164.

If cache space is released at 170, the amount of cache memory space remaining in use and not released is compared to the high threshold at 172. If the amount of cache space in use is greater than the high threshold as determined at 172, the release of cache space continues by reversion back to and continuance of the step at 170. If the amount of cache space in use is not greater than the high threshold, or stated alternatively the amount of cache free space has increased to the desired high threshold, as determined at 172, the release of cache space is terminated by the movement of the process flow to the end at 164.

As is shown at 124 in FIG. 9 and at 152 in FIG. 10, both the high and low thresholds are directly related to the allocation predictor. By making both thresholds directly related to the allocation predictor, the high and low thresholds are dynamically changed on more frequent basis of the allocation intervals. The more dynamically changing allocation predictor results in a continual adjustment of the amount of free space available in the cache memory. Adjusting the amount of cache memory free space on a continual dynamic basis results in maximum cache memory utilization, in distinction to the prior art where the fixed threshold values prevent maximum utilization under varying workloads.

Furthermore, the high and low thresholds are different from one another by the value of the blockage predictor, as is understood from steps 124 and 152. The difference between the high and low thresholds constitutes a window of inactivity between releasing cache space and ceasing the release of free space. This window is directly related to blockage predictor, and is in fact equal to the blockage predictor. Because the cache memory space utilization and maximum cache free space are separated by this window defined by the blockage predictor, there is more effective use of the cache memory space. The blockage predictor is also satisfactory for anticipating the demand for allocations without blockages. The double effect of the blockage predictor in the low threshold (the low threshold equals the allocation predictor plus two times the blockage predictor) represents the anticipated amount of time it will take to start releasing cache memory space in a very saturated or loaded environment of I/O requests. The occurrence of blockages indicates a high number of I/O requests in the system, and blockages generally indicate a high level utilization. Because of the high level of utilization it will take more time for the cache memory subsystem to find opportunities to discard the cache memory when I/O requests are not present. Thus, multiplying the blockage predictor to establish the low threshold provides the added opportunity to trigger the release of cache memory space to reduce the number of blockages even in a highly loaded environment.

From the preceding description of embodiments of the present invention, it is apparent that the low and high thresholds for managing the release of free cache memory space are adjusted on a dynamic basis to reflect the actual operating conditions of the computer system. Maximum utilization of the cache memory is obtained without encountering the typical arbitrary restrictions common to the static threshold approaches to managing cache memory. The degree of adaptability of the dynamic adjustment of the present invention is adjustable by using both the high and low thresholds and adjusting the thresholds on a rapid basis. Furthermore, the present invention accommodates the possibilities that the computer system will experience a high load of I/O requests which would otherwise prevent the effective release of cache memory space because of the priority given to the I/O requests, by adjusting the low threshold to release the cache space at a level which anticipates such an eventuality. Many other improvements and advantages are apparent.

Present preferred embodiments of the invention and many of its improvements have been described with a degree of particularity. This description is of a preferred example for implementing the invention, but the scope of the invention should not necessarily be limited by this description. The scope of the present invention is defined by the following claims.

The invention claimed is:

1. A process for controlling an amount of free space in a cache memory of a computer system having a host computer and a main memory, comprising the steps of:

determining a rate of allocations to the cache memory in response to I/O requests from the host computer, an allocation resulting from the performance of a read or write event in the cache memory in response to an I/O request from the host computer;

calculating an allocation predictor related to the rate of allocations determined;

setting a threshold of free space in the cache memory having a predetermined direct relationship to the allocation predictor;

releasing cache space in the cache memory to change the amount of free space in the cache memory based on the threshold established; and performing the aforesaid steps of determining, calculating, setting and releasing at each of predetermined number of repetitive control intervals during continuous operation of the computer system.

2. A process as defined in claim 1 wherein the step of setting a threshold further comprises the steps of:

setting a low threshold of free space in the cache memory which triggers the release of cache space to increase the amount of free space;

setting a high threshold of free space in the cache memory which terminates the further release of cache space to limit the amount of free space;

setting the high and low thresholds to have a predetermined direct relationship to the allocation predictor; and setting the high and low thresholds as different from one another.

3. A process as defined in claim 1 further comprising the steps of:

determining a rate of blockages to the cache memory in response to I/O requests from the host computer, a blockage resulting from an inability to perform a read or write event in the cache memory in response to the I/O request from the host computer;

calculating a blockage predictor related to the rate of blockages determined;

setting a high threshold of free space in the cache memory in a predetermined direct relationship to the allocation predictor;

setting a low threshold of free space in the cache memory in a predetermined direct relationship to the high threshold and the blockage predictor;

setting the low and high thresholds as not equal to one another;

monitoring the amount of free space in the cache memory during continuous operation of the computer system;

releasing cache space to increase the amount of free space in the cache memory when the amount of free space decreases to the low threshold; and ceasing the release of cache space to limit the amount of free space in the cache memory when the amount of free space reaches the high threshold.

4. A process as defined in claim 3 further comprising the steps of:

determining the allocation rate at a first frequency having allocation intervals;

determining the blockage rate at a second frequency having blockage intervals; and establishing the second frequency as different than the first frequency.

5. A process as defined in claim 4 further comprising the steps of:

establishing the first frequency as greater than the second frequency.

6. A process as defined in claim 5 further comprising the step of:

establishing the intervals of the first frequency as equal to the control intervals.

7. A process as defined in claim 3 further comprising the steps of:

determining a plurality of rates of allocations, each rate of allocation extending over a different number of control intervals than each other rate of allocations determined; and calculating the allocation predictor based on a predetermined direct relationship to each of the rates of allocations determined.

8. A process as defined in claim 7 further comprising the steps of:

determining a plurality of rates of blockages, each rate of blockage extending over a different number of control intervals than each other rate of blockage determined; and calculating the blockage predictor based on a predetermined direct relationship to each of the rates of blockages determined.

9. A process as defined in claim 8 further comprising the steps of:

weighting each of the rates of allocation determined by a different amount in calculating the allocation predictor; and weighting each of the rates of blockage determined by a different amount in calculating the blockage predictor.

10. A process as defined in claim 9 further comprising the steps of:

weighting the allocation rates which have been determined over recently occurring control intervals more heavily in the calculation of the allocation predictor than the allocation rates which have been determined over control intervals which extend to include those control intervals which occurred less recently than the most recent control intervals; and weighting the blockage rates which have been determined over recently occurring control intervals more heavily in the calculation of the blockage predictor than the blockage rates which have been determined over control intervals which extend to include those control intervals which occurred less recently than the most recent control intervals.

11. A process as defined in claim 10 further comprising the step of:

setting the high threshold as equal to the allocation predictor plus the blockage predictor.

12. A process as defined in claim 11 further comprising the step of:

setting the low threshold as equal to the high threshold plus the blockage predictor.

13. A process as defined in claim 11 further comprising the step of:

setting the low threshold as directly related to a predetermined multiplier of the blockage predictor, the predetermined multiplier being a value greater than one.

14. A process as defined in claim 10 further comprising the steps of:

limiting the allocation predictor calculated to a predetermined maximum allocation predictor value; and limiting the blockage predictor calculated to a predetermined maximum blockage predictor value.

15. A process as defined in claim 8 further comprising the steps of:

counting the number of allocations between successive control intervals to determine each allocation rate; and counting the number of blockages between successive control intervals to determine each blockage rate.

16. A process as defined in claim 15 further comprising the steps of:

recording the counted number of allocations at each allocation interval in cells of an accumulation array in a memory of the computer system;

recording the counted number of blockages at each blockage interval in cells of an accumulation array in a memory of the computer system;

determining the allocation rates by steps including subtracting values representative of the counted numbers of allocations recorded in the cells of the accumulation array; and determining the blockage rates by steps including subtracting values representative of the counted numbers of blockages recorded in the cells of the accumulation array.

17. A process as defined in claim 2 further comprising the steps of:

determining a plurality of rates of allocations, each rate of allocation extending over a different number of control intervals than each other rate of allocations determined; and calculating the allocation predictor based on a predetermined direct relationship to each of the rates of allocations determined.

18. A process as defined in claim 17 further comprising the step of:

weighting each of the rates of allocation determined by a different amount in calculating the allocation predictor.

19. A process as defined in claim 18 further comprising the step of:

weighting the allocation rates which have been determined over recently occurring control intervals more heavily in the calculation of the allocation predictor than the allocation rates which have been determined over control intervals which extend to include those control intervals which occurred less recently than the most recent control intervals.

20. A process as defined in claim 2 further comprising the step of:

determining a rate of blockages to the cache memory in response to I/O requests from the host computer, a blockage resulting from an inability to perform a read or write event in the cache memory in response to the I/O request from the host computer;

calculating a blockage predictor related to the rate of blockages determined; and setting the difference between high and low thresholds equal to the blockage predictor.

\* \* \* \* \*